Sept. 5, 1933.  F. F. BRADSHAW  1,925,555
MEANS FOR DOUBLE TRANSFER OF CARGO IN AERIAL NAVIGATION
Filed Feb. 2, 1929  11 Sheets-Sheet 2

Sept. 5, 1933.   F. F. BRADSHAW   1,925,555
MEANS FOR DOUBLE TRANSFER OF CARGO IN AERIAL NAVIGATION
Filed Feb. 2, 1929   11 Sheets-Sheet 5

Sept. 5, 1933. F. F. BRADSHAW 1,925,555
MEANS FOR DOUBLE TRANSFER OF CARGO IN AERIAL NAVIGATION
Filed Feb. 2, 1929 11 Sheets-Sheet 10

Sept. 5, 1933.  F. F. BRADSHAW  1,925,555
MEANS FOR DOUBLE TRANSFER OF CARGO IN AERIAL NAVIGATION
Filed Feb. 2, 1929   11 Sheets-Sheet 11

Patented Sept. 5, 1933

1,925,555

UNITED STATES PATENT OFFICE 1,925,555

MEANS FOR DOUBLE TRANSFER OF CARGO IN AERIAL NAVIGATION

Frank F. Bradshaw, Oxford, N. C., assignor of five per cent each to C. A. Williams, Sr., C. A. Williams, Jr., J. L. Williams, S. A. Van Every, all of Charlotte, N. C., and to B. A. Smith, Kings Mountain, N. C., twenty-five per cent to Paul B. Eaton, Charlotte, N. C., and twenty-five per cent to R. E. Ward, Granville County, N. C.

Application February 2, 1929. Serial No. 336,934

11 Claims. (Cl. 258—1)

This invention relates to methods and means of handling cargo in aerial navigation and relates more especially to means for transferring cargo from one flying machine to another, and at the same time picking up cargo from one airplane and attaching it to the other.

An object of my invention is to provide means whereby one flying machine may pass over another flying machine and attach cargo from the upper flying machine to the lower flying machine, and at the same time pick up cargo from the lower flying machine.

Another object of my invention is to provide a carriage or moving object having means thereon for holding a cargo and additional means thereon for receiving a cargo and means on said carriage or moving object to separate the two cargoes and to allow one cargo to be taken off of the moving object by another moving object thereabove and to attach cargo to the lower moving object at the same time.

Another object of my invention is to provide means for a double-transfer of cargo between two flying machines, means being provided in the two flying machines whereby cargo from the upper flying machine may be attached to the lower flying machine and at the same time cargo may be picked up from the lower flying machine by the upper flying machine and carried away by the upper flying machine.

Another object of my invention is to provide means which are capable of being used in connecting with any type of aircraft which will enable one aircraft passing over another aircraft to pick up cargo from the lower aircraft and to attach cargo to the lower aircraft at the same time.

Another object of my invention is to provide means on a moving object whereby another moving object thereabove can pass over the lower moving object and pick up cargo from the lower moving object and carry the said cargo away, and at the same time attach cargo to the lower moving object.

Some of the objects of my invention having been stated other objects will appear as the description proceeds, when taken in connection with the accompanying drawings, in which—

Figures 26, 27, 28, 51:
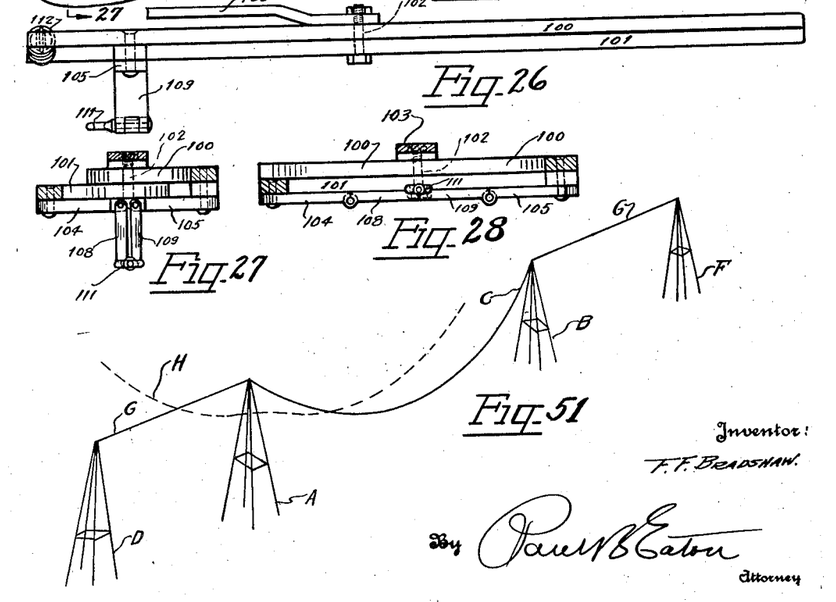
Figure 26 is a side elevation of the shears.
Figure 27 is a view taken along the line 27—27 in Figure 23.
Figure 28 is a view taken along the line 28—28 in Figure 22.
Figure 51 is a diagrammatic view of the towers with which my carriage is adapted to be used.

I shall first describe my invention as used in connection with a carriage mounted on a cable suspended between two towers with two other towers mounted at some distance from the cable supporting towers, and adapted to have cords stretched from the supporting towers to the auxiliary towers. In Figure 51 I show a diagrammatic view of the towers in which the towers A and B are adapted to support the cable C therebetween and the towers D and F are adapted to support the cord G which is adapted to release the carriage means on the cable which will be presently described.

Each of the towers which are adapted to support the cable C have four vertical columns 10, 11, 12 and 13 with a plurality of braces 15 to strengthen the said towers, and in the top of the said towers the end of the said cable C is secured as at the point 16 and at this same point the pulley 17 is secured which pulley is a double grooved pulley. Pivotally mounted on cross-member 18 between the front posts of the tower is the bell crank lever 19 having a forwardly projecting portion 20 with a hook in the lower portion thereof which is adapted to engage the roller 21 on the carriage 22, which carriage will be later described. Transverse bars 23 and 24 are secured on the tower and these support the sliding member 25 which has a hook 26 thereon, in which the pin 27 which supports the grooved pulley 28 is adapted to rest, and the projection 29 fits against the forward face of the pulley frame 30, and the upper end of this pulley-frame has an eye 31 in which the cable 32 is adapted to be secured by means of which the weight 33 may be raised by the windlass 34 secured in the lower part of the tower. Also secured to the eye 31 is the cable 36 which runs upwardly over the grooved pulley 17 and down through the grooved pulley 28 and back up over the grooved pulley 17 and downward to the roller 38 and this cable 36 runs outwardly a distance of a hundred feet or more where it passes around another roller, not shown, and back up to the carriage 22 where a member 40 hooks in a slot 41 on the bottom of the carriage 22. Also suspended in the top of the tower is the pulley 43 in which the cable 44 is adapted to move, which cable extends downwardly and is secured to the windlass 45, and the other end of the cable has the transversely disposed pin 46 therein (see Figure 12) which is adapted to hook in the hook 47 in the carriage for the purpose of moving the carriage up against the tower, and against the pressure of the compression spring 49.

Figures 29, 30, 31, 32, 33, 34, 35, 36:
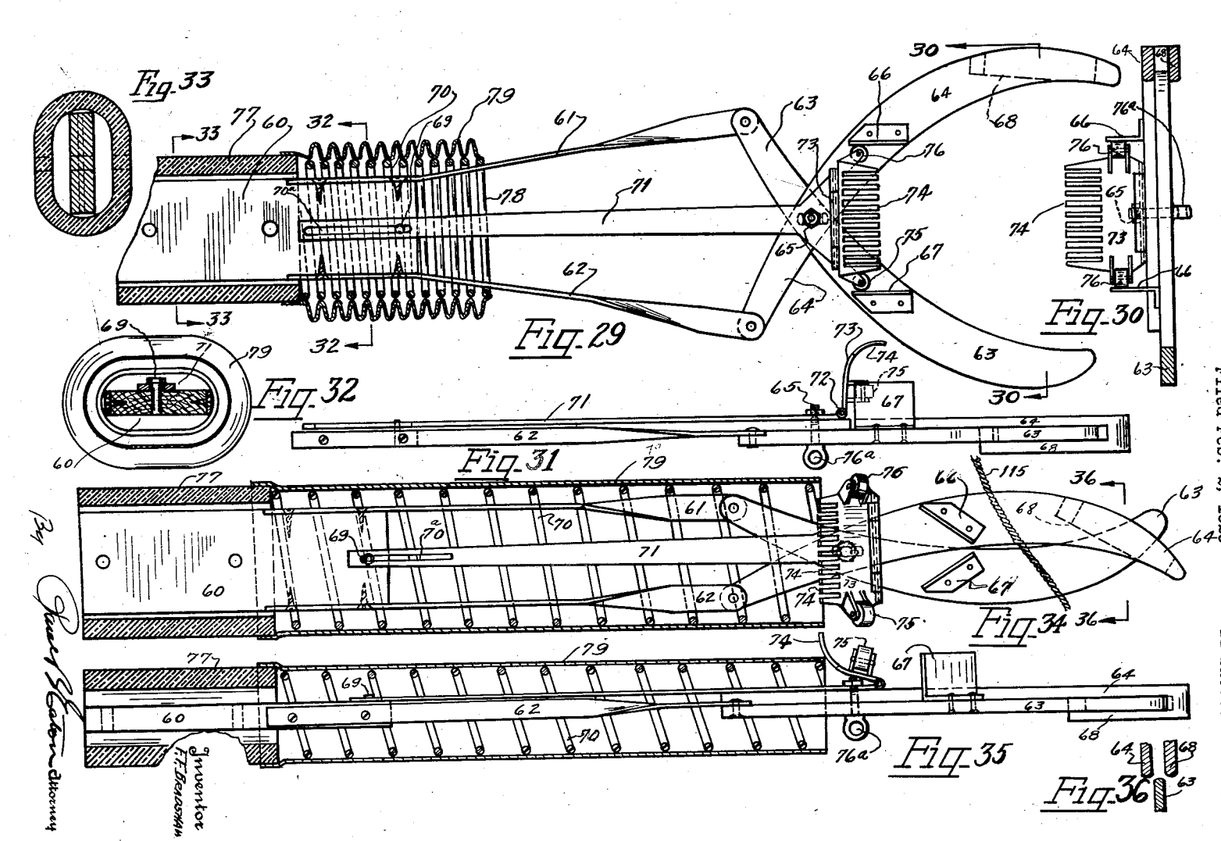
Figure 29 is an enlarged plan view partially in cross-section of the upper grippers, showing the front portion of the structure shown in Figure 13.
Figure 30 is an end view of Figure 29 standing on edge.
Figure 31 is a side elevation of Figure 29 looking upward.
Figure 32 is a cross-sectional view taken along the line 32—32 in Figure 29.
Figure 33 is a cross-sectional view taken along the line 33—33 in Figure 29.
Figure 34 is a view of the structure shown in Figure 29 but showing the grippers in closed position.
Figure 35 is a side elevation partially in cross-section of the structure shown in Figure 34.
Figure 36 is a cross-sectional view taken along the line 36—36 in Figure 34.

The carriage 22 is composed of the vertically disposed members 50 and 51 in which the grooved pulleys 52 and 53 are mounted on the pins 54 and 55, which pulleys are adapted to rest on the cable c, and these members 50 and 51 are spaced apart from each other. On the sides of the members 50 and 51 are the outwardly projecting shelf members 54a and 55a which are supported by the braces 56a, and on the sides of the members 50 and 51 are secured the hook members 47 which have just been described. The rollers 21, which have already been described, are secured on the sides, over which the hook end of the bell crank lever 20 is adapted to be hooked to hold the carriage up against the compression spring 49 as above described. In the space between the members 50 and 51 and on the upper side thereof is adapted to fit the member 56 which is hollow and has the closure 57 secured thereto by any suitable means, and the hook 58 to which additional cargo 150 can be secured, and cargo can be placed on the interior of the member 56. Closure 57 has thereto hook 57a which is adapted to engage eye 57b for holding the closure 57 in closed position. A detail of this member is shown in Figures 13 and 14, and Figures 29 to 36 inclusive. This type of gripper is adapted to have the out-going cargo secured thereto, and will be described in detail as follows:

The base member 60 has secured on each side thereof the leaf spring members 61 and 62, which have pivoted at their free ends the jaws 63 and 64, which jaws are pivotally secured to each other by the bolt 65 and these jaws extend outwardly and have the lugs 66 and 67 secured thereon, and the jaw 64 has the additional member 68 secured thereon to form a groove into which the end of the member 63 is adapted to fit when the grippers are in closed position as shown in Figure 34. Piercing the block or base member 60 is the bolt 69, which is adapted to fit in a slot 70a in the member 71, which member 71 is secured to the jaws 64 and 63 by the bolt 65, and this member 71 has a hinge 72 at its forward end to which is hingedly connected the trigger member 73 which has the prongs 74 thereon to engage the trailing cord from the flying machine and on the outer edges of this member 73 there are the rollers 75 and 76, which are adapted to rest against the lugs 66 and 67 to hold the grippers in open position, it being evident that when the trailing cord strikes the prongs 74 that the rollers 76 and 75 will be pushed backwardly and the parts will assume the position shown in Figure 34. The bolt member 65 has the eye 76a thereon to which is adapted to be secured a cord for tripping the lower gripper and also additional cargo can be secured in this eye 76a. Mounted around the base portion of the base or block member 60 is the rubber member 77 and around the leaf spring members 61 and 62 is mounted the compression spring 78 and around all of the members just described is the flexible rubber member 79, it being adapted to cover the entire mechanism including the trigger arrangement when the grippers are in closed position to prevent the grippers from punching a hole in a balloon or an airplane when the outgoing mail is being picked up. This gripper for outgoing mail, which has just been described is adapted to be used on all types of my device whether the same is to be used on a carriage on an airplane or on a balloon, the only difference being that when it is used on a carriage or in other uses as above described the portion 56 may be attached to the base portion 77 and the block 60 if desired, or the structure as shown in Figures 29 to 35 may be used without the member 56 being attached thereto.

Figures 52, 53, 55, 56, 57:
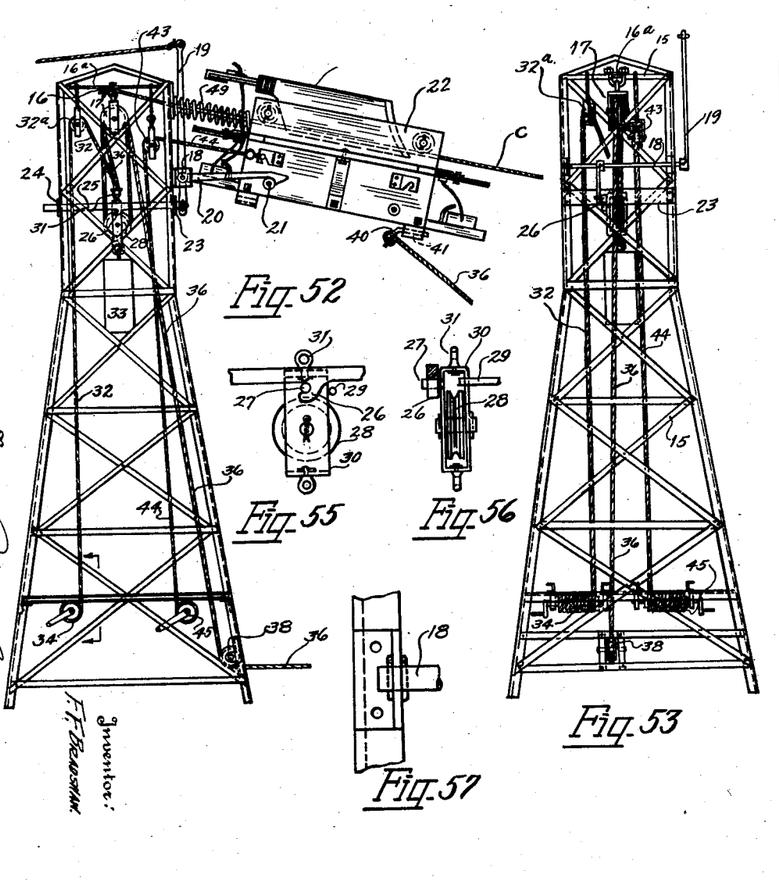
Figure 52 is a side elevation of one of the towers showing my carriage and means for starting the same.
Figure 53 is a view of the tower shown in Figure 52 and looking from the right hand side of the tower in Figure 52.
Figure 55 is an enlarged detail view of the means for holding the block on which the weight is suspended.
Figure 56 is a view of Figure 55 looking from the right hand side thereof.
Figure 57 shows the manner in which the crank-arm is pivoted.
Figure 54:
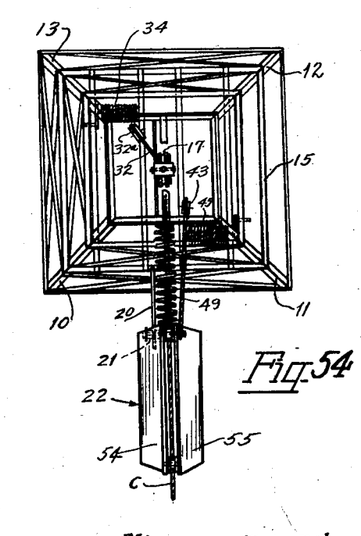
Figure 54 is a plan view of the tower and carriage.
Figure 58:
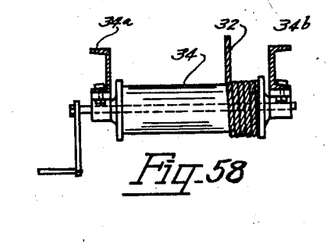
Figure 58 is an enlarged view of one of the windlasses used in the tower.
Figures 59, 60, 61, 62, 63, 64, 65, 66, 67:
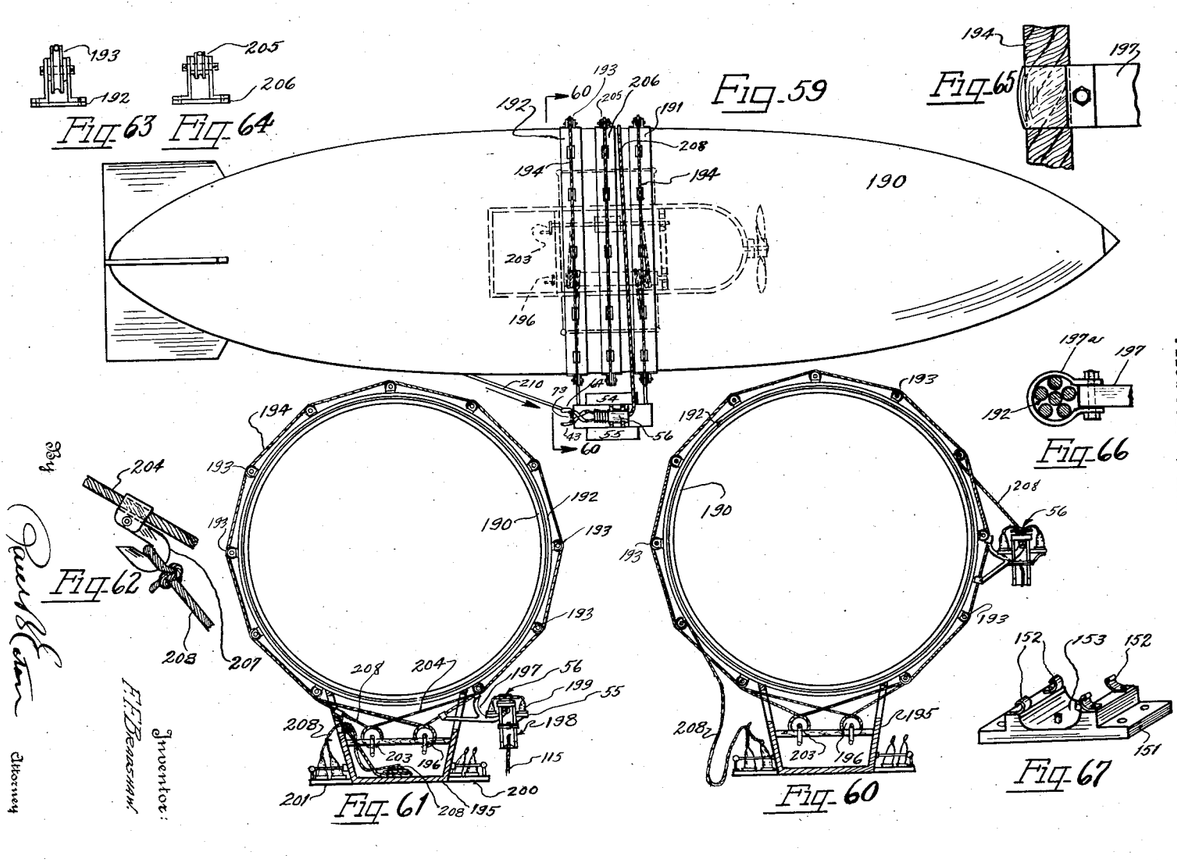
Figure 59 is a plan view of a dirigible balloon equipped with my invention.
Figure 60 is a cross-sectional view taken along the line 60—60 in Figure 59, and showing my device in operating position.
Figure 61 is a view taken along the same line as Figure 60 but showing the invention having the carriage lowered position for cargo to be attached or detached.
Figure 62 is an enlarged detail view of the hook and cable for passing the cord around the balloon.
Figure 63 is an enlarged detail view of one of the pulleys for carrying the cable around the balloon.
Figure 64 is a view of the roller for carrying the cord around the balloon.
Figure 65 is an enlarged detail view showing the manner of attaching the carriage to the cable.
Figure 66 is a cross-sectional view through the cable and looking downward on the carriage supporting means as shown in Figure 65.
Figure 67 shows the means which are required on all types of aircraft for holding the outgoing grippers except in places where I use the grippers as shown in Figure 13.

The cable 32 passes over the pulley 32a supported in the top of the tower on bar 16a. The windlasses 34 and 45 are held in position by means of the members 34a and 34b.

On cable 44 is a metal ball 44a, which is adapted to jerk the pin 46 out of the hook 47 when the carriage is pulled up in position, and hooked and then pressure is relieved from the cable 44, which will cause the ball to fall downwardly and relieve the pin 46 from the hook 47.

Figures 37, 38, 39, 40, 41:
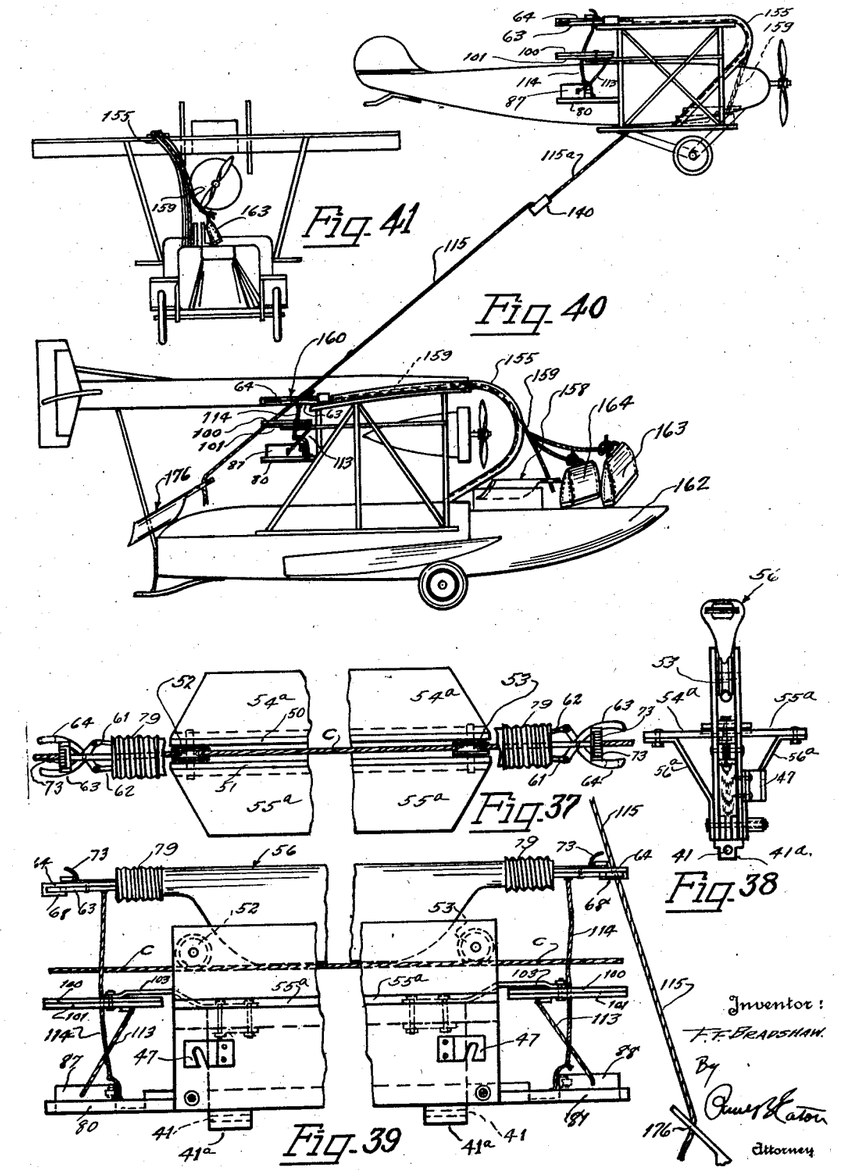
Figure 37 is a plan view of my carriage which is adapted to move along a cable suspended between two towers.
Figure 38 is an end view of Figure 37 with the carriage in vertical position.
Figure 39 is a side elevation of Figure 37 showing the central portion thereof broken away.
Figure 40 is a side elevation of two airplanes, one of them being of an amphibian type, and both of them being equipped with my invention.
Figure 41 is a front elevation of the lower airplane shown in Figure 40.

On the bottom of the carriage there is a member designated by the reference character 41a which has the slot 41 therein, in which the member 40 hooks, as has been previously described with relation to Figures 38 and 39.

In all places where I use the upper or outgoing gripper which has just been described, I also use a pair of shears and lower grippers which will be described in connection with my carriage, and it being evident that these structures may be attached to other structures, such as a balloon, airplane, ship and other devices. The lower grippers which are adapted to grip the incoming cargo and hold the same are best illustrated in Figure 11 and Figures 15 to 21 inclusive. These grippers are adapted to be secured below the upper or outgoing gripper and also below the shears which will be described presently, and these lower grippers comprise the side members 80 and 81 which are adapted to be secured in any suitable manner and spanning between members 80 and 81 is the member 82 to which is pivotally connected trigger 83, which has the upwardly projecting lever 84 and mounted on the ends of the trigger 83 are the rollers 85 and 86 which are adapted to press against the jaws of the lower gripper which jaws are indicated by the numerals 87 and 88, and these jaws are pivotally connected to the side members 80 and 81 by means of the bolts 89 and 90, said arrangement being very similar to a hinge and in this hinge member there is the torsional spring 91 which is adapted to close the jaws 87 and 88 when they are released by the rollers 85 and 86. Secured to the jaw 87 is the eye member 92 to which a cord is adapted to be secured for tripping the shears, which arrangement will be presently described. Secured to the lower portion of the member 82 as at 93 is the latch 94 which when in the position shown in Figure 19 will prevent the jaws 87 and 88 from moving downwardly past a line horizontal to each other and this requires the jaws to grip the cord which will pass there between, but when this is turned to the position shown in Figure 17, it allows the jaws 87 and 88 to pass downwardly and relieve the incoming cargo which is attached to the cord held by the jaws 87 and 88.

Figures 11, 12:
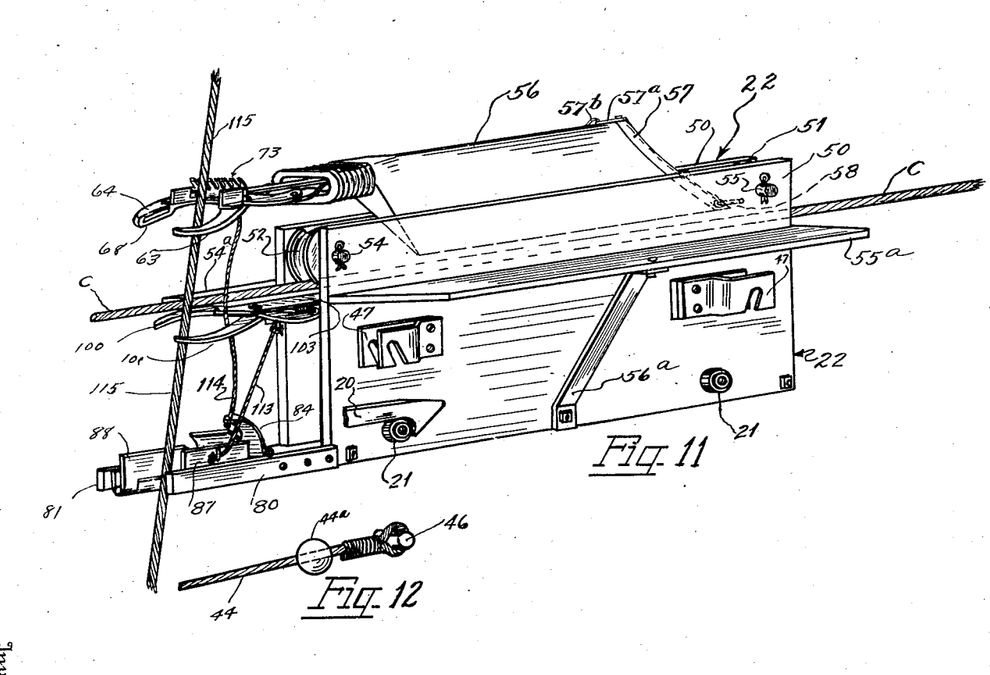
Figure 11 is a perspective view of my carriage device showing my grippers and shears thereon.
Figure 12 is an enlarged detail view of the end of the cable showing means for securing the carriage in position next to the tower.
Figure 13:
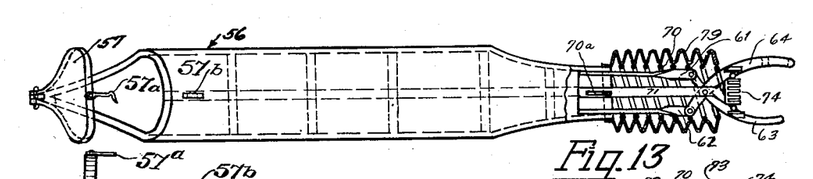
Figure 13 is a plan view partially in cross-section showing my grippers for handling out-going cargo.

Referring more particularly to Figures 11 and 22 to 28, I shall now describe the shears which are adapted to be secured between the upper and lower grippers. These shears comprise the blades 100 and 101 which are pivotally secured to each other intermediate their ends by the bolt 102, and also secured on this bolt is the support 103 which is adapted to be secured to the carriage as shown in Figure 11, and is also adapted to be secured to an airplane or balloon as the case may be, between the upper and lower grippers, as is shown in Figures 1, 40, 42 and 47, by having the support 103 attached to any suitable object. Fixedly secured to the blades of the shears 100 and 101 are the lugs 104 and 105, which have pivotally secured in their outer ends as at 106 and 107, the toggle joint members 108 and 109, which toggle joint members are pivotally secured to each other by the pin 110, said pin 110 having the eye 111 in one end thereof, and at the base of the members 100 and 101 there are holes in which the tension spring 112 is adapted to be secured, which spring has a normal tendency to keep the jaws 100 and 101 in closed position. When the pin 110 is pulled downwardly this will trip the pivot point and the spring 112 will quickly close the shears as shown in Figure 27, while the position of parts when the shears are in open position is shown in Figure 28.

Now, referring to Figures 1, 11, 15, 18, 39, 40, 42, 47 and 52 it will be seen that the cord 113 is secured to the eye 111 and also secured to the eye 92 in one of the lower grippers, and the cord 113 may be a flexible chain or a cable, and need not necessarily be formed of a vegetable material, as the same will be a permanent fixture. The cord 114, however, must be of a material which can be easily cut by the shears. This cord 114 is secured to the eye 76 in the upper grippers and passes downwardly between the blades of the shears and is secured to the lever 84 of the trigger 83 of the lower grippers by being secured in the eye 84a in said lever. It is apparent that when the trailing cord 115 enters the upper grippers that the same will be closed and grip the cord and the upper grippers will be carried away by the cord with the outgoing cargo and this will pull the cord 114 and trip the lower grippers and thus grip the lower end of the cord 115 and when the lower grippers close this will pull the cord or chain 113 and spring the toggle joint mechanism on the shears, shown in Figure 27, and this will cause the shears to close quickly and sever the cord 115 and also sever the cord 114.

Having described the grippers and shears for holding the incoming cargo and allowing the outgoing cargo to be picked up by the plane thereabove, I shall now describe the means employed in the aircraft for bringing into the aircraft the outgoing cargo which has been picked up by the said aircraft from a carriage or a lower aircraft. This comprises a conventional cockpit which is indicated by the reference character 120 (see Figures 6, 7, 8 and 9). In front of this cockpit will be provided a compartment 121, though this compartment may be in the rear of the cockpit if desired, which has the vertically disposed walls 122 and 123, and to the wall 122 there is secured the supports 124 and 125 in which the windlass member 126 is secured, which windlass member has the ratchet 127 which has the dog 128 adapted to prevent the same from turning to allow the cargo to be lowered when the dog 128 is in engagement with the ratchet 127. On the other end of the windlass 126 there is secured the brake band 129 which is secured to the pedal 130, pivoted as at 131 and which pedal projects back into the cockpit and within reach of the foot of the pilot who can press on the same after throwing the dog 128 backward, and thus allow the cargo on the cord 115 to be lowered, which lowering can be regulated by the brake above described. When it is desired to wind up the cord 115 the dog is thrown forwardly into engagement with the ratchet to the position shown in Figure 6, and the crank 132 is turned and the windlass is thereby rotated and the cords 115a and 115 are wound onto the windlass and the cargo which is picked up from a lower aircraft or carriage is wound upward and into the upper craft.

Figures 5, 6, 7, 8, 9, 10:
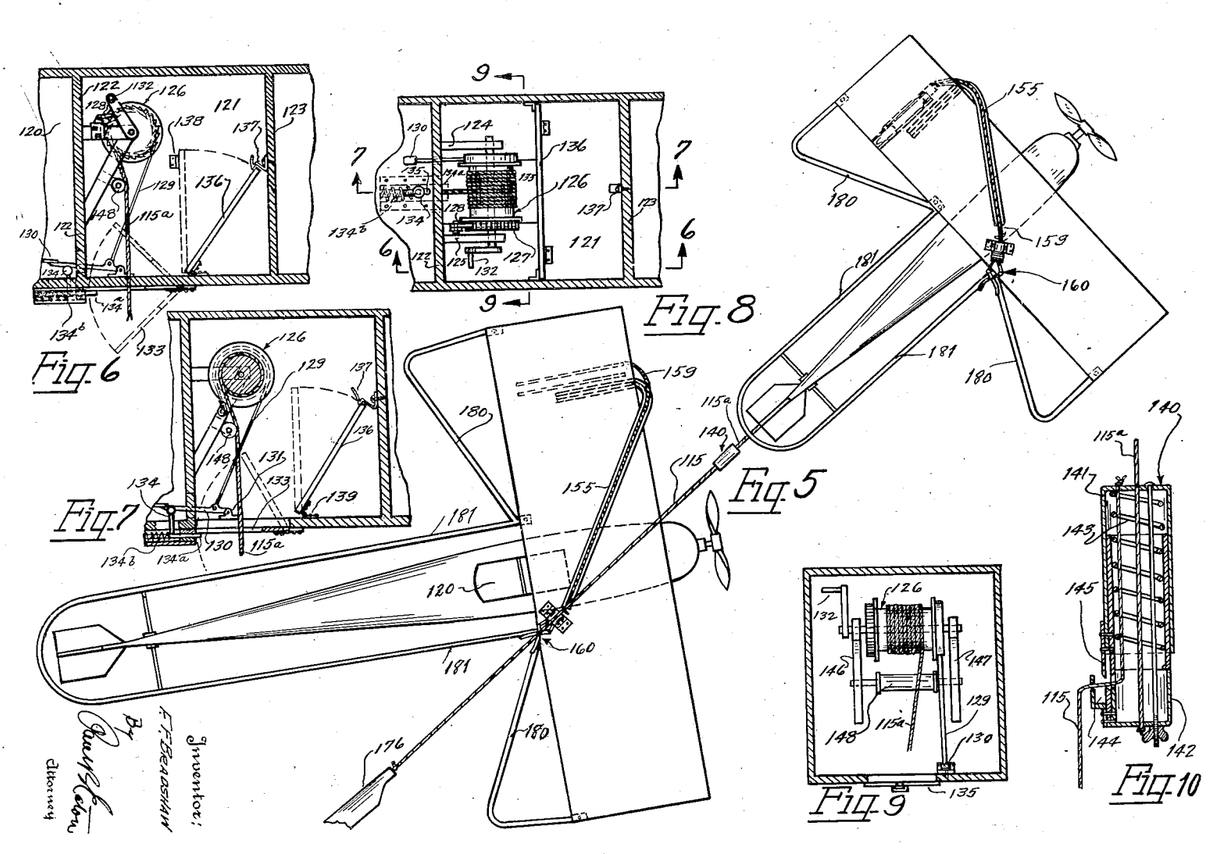
Figure 5 is a plan view of two airplanes showing the upper one passing over the lower one, both of them being equipped with my invention.
Figure 6 is a cross-sectional view taken along the line 6—6 in Figure 8, and relates to the means in the airplane for handling the cargo.
Figure 7 is a cross-sectional view taken along the line 7—7 in Figure 8.
Figure 8 is a plan view of the windlass means in an airplane for handling cargo.
Figure 9 is a cross-sectional view taken along the line 9—9 in Figure 8.
Figure 10 is a cross-sectional view of the safety means adapted to sever the cord trailing from an airplane when undue strain is placed thereon.

Secured to the lower part of the compartment 121 is the hinged door 133 which can fall downwardly or be pulled upwardly from a horizontal line, and controlled by the foot dog 134 which normally projects into the path of the door 133. This door has the slot 135 therein thru which the cord 115 is adapted to pass. Also secured in the compartment 121 is the hinged partition 136 which can be secured in position under the spring member 137 if so desired, or it can project against the lug 138 and assume a vertical position by means of a spring hinge 139 which normally holds it in vertical position.

The point 134a holds the door 133 in position, the latch or foot-dog 134 being held forwardly in the path of the door, normally by the spring 134b.

Secured in the cord 115 is the safety mechanism 140 which comprises the telescoping casings 141 and 142 which are held apart from each other by means of the compression spring 143, and the portion of the cord 115 which is designated as 115a and which is wound onto the windlass 126 is secured in the lower end of the casing 142, and the cord 115 is secured in the hole in the upper end of casing 141, and a hole is provided in the bottom of casing 142 to which the cord 115 projects, and this hole has a knife edge with the lug 144 having a hole therethrough and the casing 141 has the knife 145 thereon so that when an enormous amount of pressure is exerted on the cords 115 and 115a or a strain greater than that encountered in picking a reasonable amount of cargo, such as when the trailing cord should become fouled with any immovable object then the casings will be pulled toward each other and the knife 145 will sever the cord 115 and prevent the upper craft from being wrecked and will thus separate the upper craft from any object with which the cord 115 has become entangled. On the supports 124 and 125 the braces 146 and 147 are provided and between these braces the roller 148 is secured over which the cord 115a is adapted to roll.

In Figure 11 I have shown only one end of my carriage equipped with the grippers and shears, but it is evident from Figure 39 that both ends of the carriage are adapted to be equipped with the grippers and shears and the upper grippers are adapted to be reversed to suit either end of the structure.

Figures 1, 2, 3, 4:
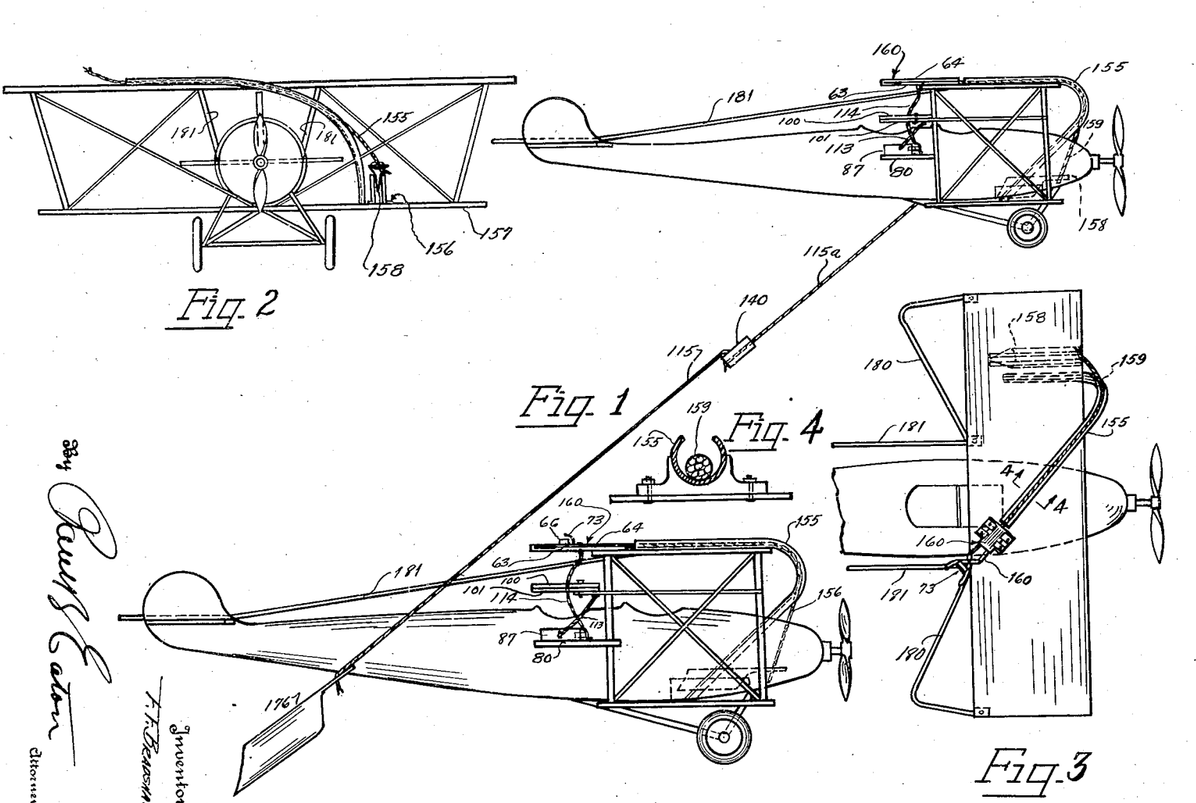
Figure 1 is a side elevation showing two airplanes moving in the same direction and both of them being equipped with my invention.
Figure 2 is a front elevation of one of the airplanes in Figure 1.
Figure 3 is a plan view of one of the airplanes in Figure 1.
Figure 4 is an enlarged detail cross-sectional view taken along the line 4—4 in Figure 3.
Figures 14, 15, 16, 17, 18, 19, 20, 21:
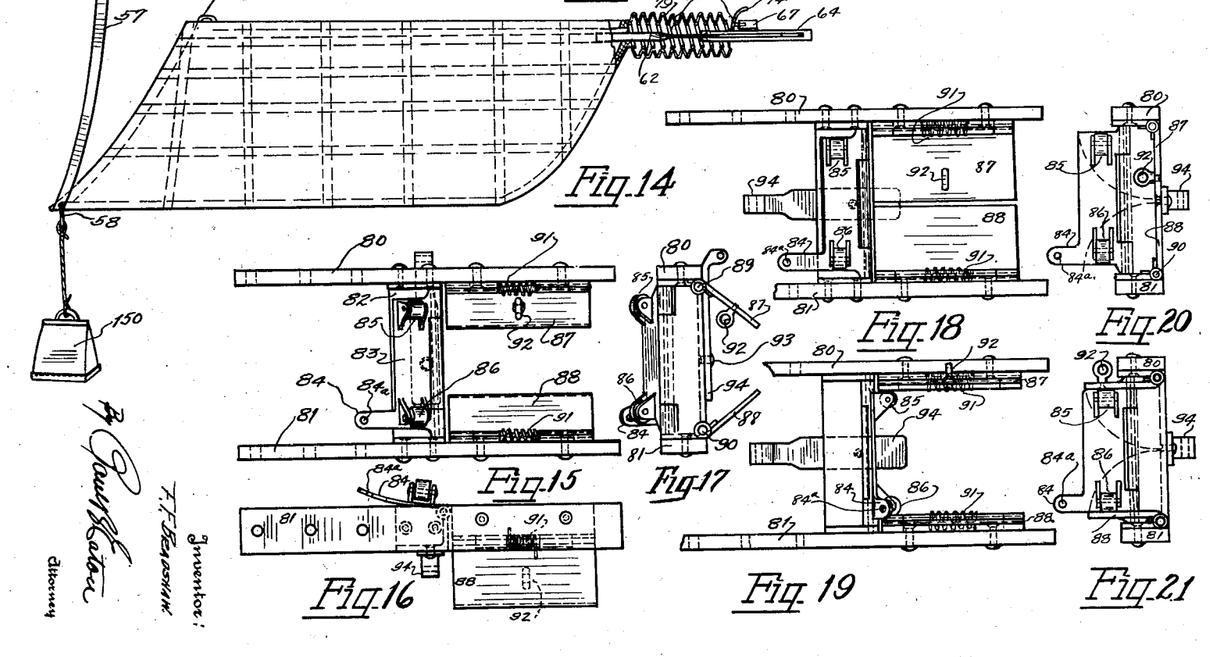
Figure 14 is a side elevation partly in cross-section of Figure 13.
Figure 15 is an enlarged plan view of the lower grippers for holding in-coming cargo.
Figure 16 is a side elevation looking from the lower side of Figure 15.
Figure 17 is an end view of Figure 15 with the structure standing on edge.
Figure 18 is a plan view similar to Figure 15 but showing the grippers in closed position.
Figure 19 is a view similar to Figures 15 and 18 but showing the grippers in open position.
Figure 20 is an end view of Figure 18.
Figure 21 is an end view of Figure 19.
Figures 22, 23, 24, 25:
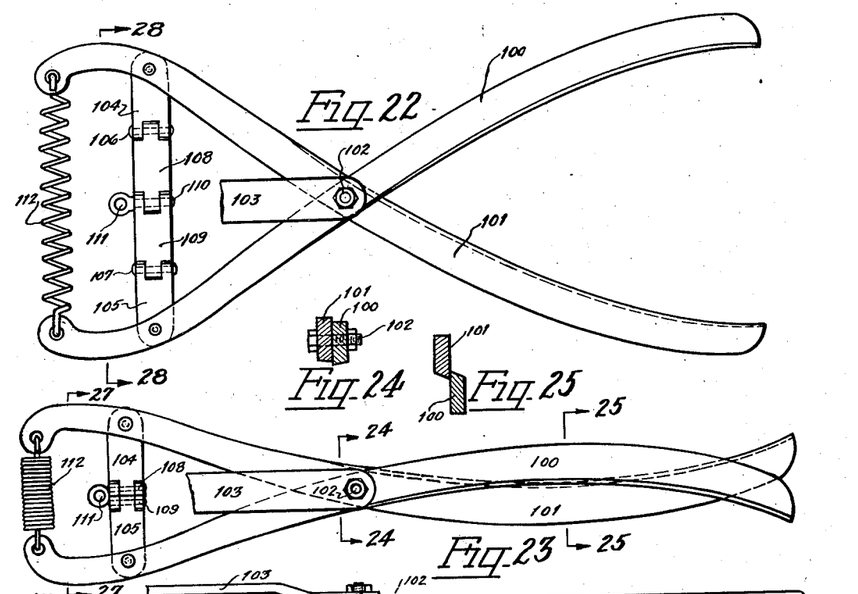
Figure 22 is a plan view of my shears adapted to be placed between the upper and lower grippers.
Figure 23 is a plan view of the shears showing them in closed position.
Figure 24 is a cross-sectional view taken along the line 24—24 in Figure 23.
Figure 25 is a cross-sectional view taken along the line 25—25 in Figure 23.

In Figure 14 I show the additional cargo 150 secured in the ring 58, it being understood that any amount of additional cargo can be secured to the out-going grippers as is clearly shown in Figures 40, 42, 43, 48, 49 and Figure 60. In Figures 1, 2 and 3 I show the upper or out-going grippers secured on the top wing of the plane and they are secured there by means shown in Figure 67 which comprises a block 151 with the spring members 152 thereon which spring apart to allow the grippers to be placed in the groove 153, and when the trailing cord 115 picks up the out-going grippers the members 152 spring apart and allow the out-going grippers to be carried away by the cord 115. In Figures 1, 2 and 3 I show the pipe 155 leading over the top of the wing and across the front of the fuselage over to the point 156 on the lower wing 157 of the plane where the out-going cargo 158 is secured and the cord 159 runs from the out-going grippers 160 to the out-going cargo 158. This arrangement prevents the cord from becoming fouled with the propeller of the airship.

In Figures 40 and 41 I show my invention applied to an amphibian plane which has the projection 162 on which the bags of mail or other cargo 163, 164, and the out-going members 158 are secured to the cord 159 which runs in the pipe 155 back to the out-going grippers 160. This leads the cord to the out-going cargo more in sight of the propeller and allows the out-going cargo to be picked up without in any way injuring the plane by the cord becoming fouled with the propeller.

Figures 42, 43, 44:
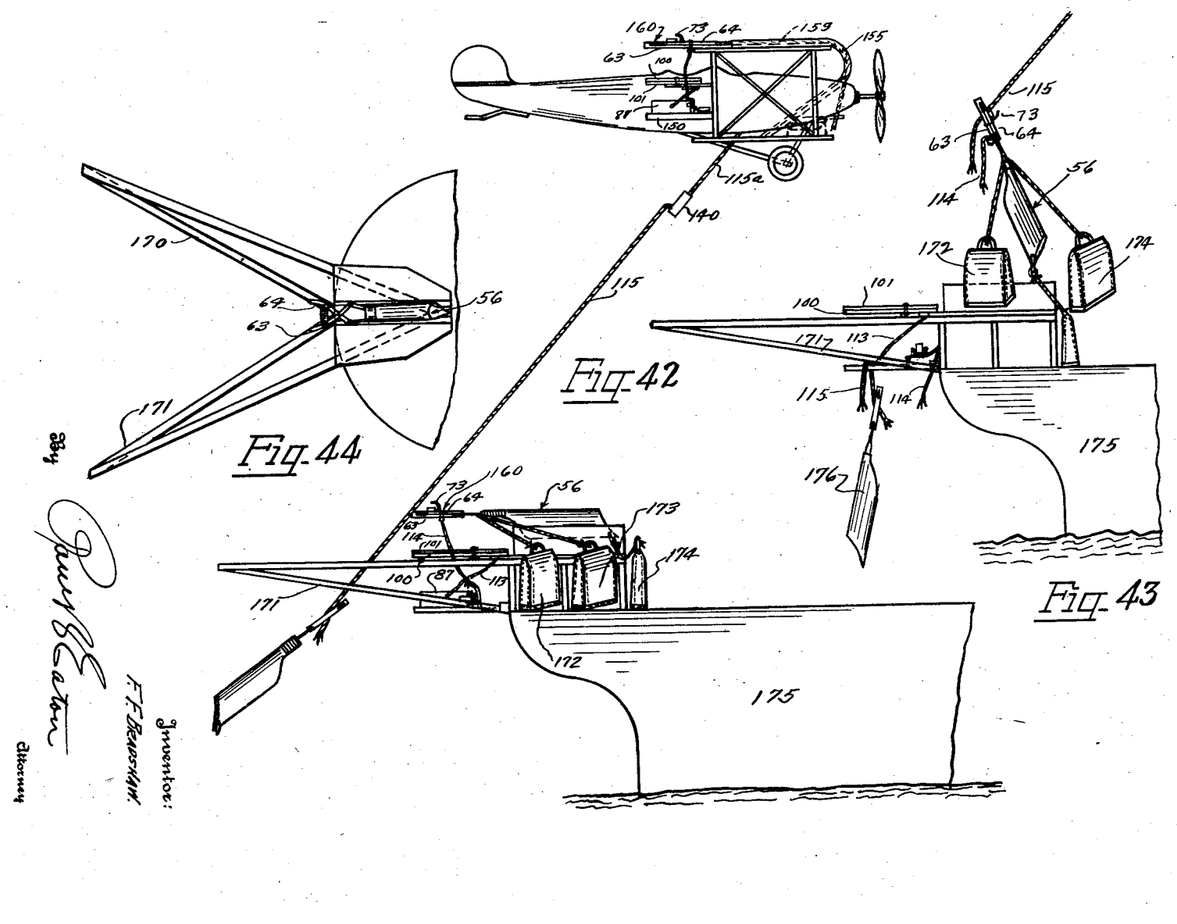
Figure 42 is a side elevation of the ridge of the stern of a ship and an airplane equipped with my invention.
Figure 43 is an enlarged detail view of the lower portion of Figure 42 and showing the outgoing cargo leaving the ship.
Figure 44 is a plan view of the stern of the ship.

In Figures 42, 43 and 44 I show my device being applied to picking up cargo from the stern of the ship, and also attaching cargo to the stern of the ship, and in this case my out-going grippers and the shears, and the grippers for holding the in-coming mail which has been described on a framework on a stern of a boat and has the guides 170 and 171 to guide the trailing cord 115 into the grippers and shears so as to allow the out-going grippers 56 to be carried away together with the cargo 172, 173 and 174 which is picked up from the stern of the ship 175. The in-coming cargo 176 is attached to the lower grippers and held by the members 87 and 88, and the shears 100 clip the trailing cord 115 and allow the out-going mail or cargo 56 to be carried away, and the in-coming cargo 176 to be retained by the ship.

Figure 45:
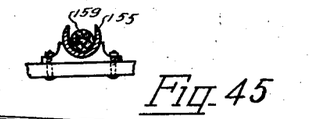
Figure 45 is a cross-sectional view taken along the line 45—45 in Figure 46.
Figure 46:
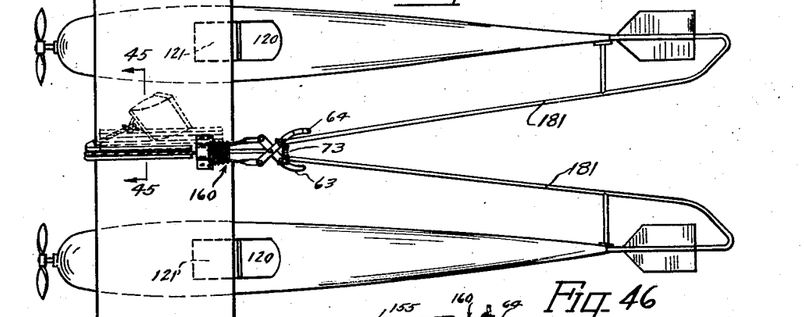
Figure 46 is a plan view of an airplane having two fuselages and two motors, and being equipped with my invention.
Figures 48, 49, 50:
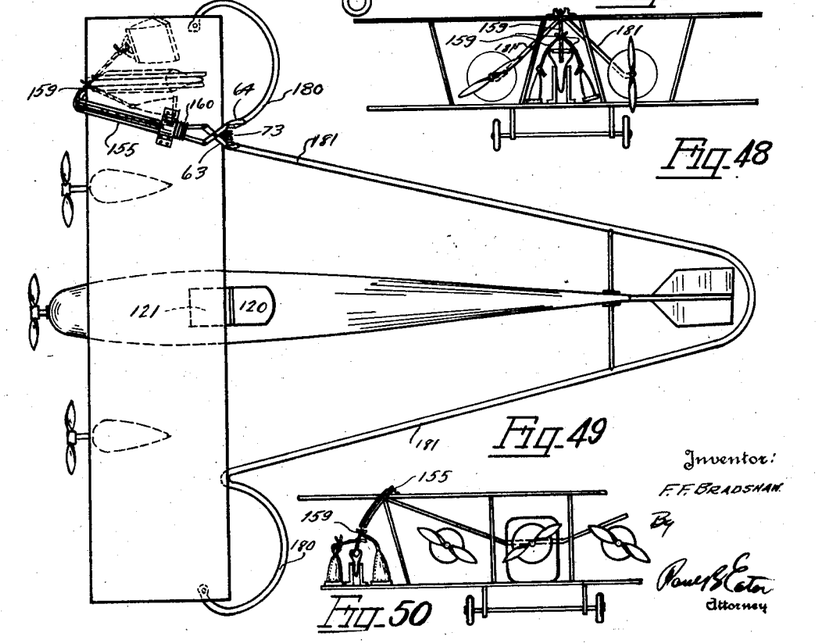
Figure 48 is a front elevation of Figure 45.
Figure 49 is a plan view of a tri-motored airplane equipped with my invention.
Figure 50 is a front elevation of Figure 49.

On all of the airplanes on which my invention is used I provide the guards 180 for the wings and 181 for the fuselage and I secure my in-coming and out-going cargo handling devices at the apex of these two guards, and this is true in all of the views of the drawings, except in Figure 45 where I provide the guards 181 only for the inside of the fuselage to guide the trailing cord into the grippers. In Figure 49 I show my device as applied to a tri-motored airplane, and in which case I show the cargo as being placed near the tip of the wing, but it is to be understood that the wings of a tri-motored plane are very much longer than shown in the drawings, which would mean that the cargo would be placed nearer to the fuselage than to the tip of the wings in the conventional tri-motored plane, and it is to be understood that where a monoplane is to be used that a shelf would be provided beneath the wing of a monoplane, or within the wing of the monoplane in which the outgoing cargo could be placed and withdrawn from the front portion thereof or to provide a door in the lower part of the wing which would open to allow the outgoing mail or cargo to fall from the wing as it is carried away by the upper plane.

Figure 47:
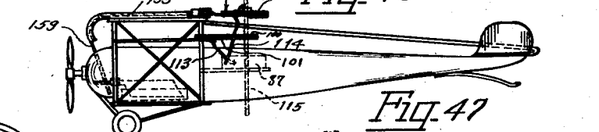
Figure 47 is a side elevation of Figure 46.

In Figure 49 I show the conventional guards 180 and 181 with the grippers for the outgoing cargo to be attached thereto, and it is to be understood that the shears and lower grippers are in position beneath the grippers shown, which is evidenced from Figure 47, and I lead the cord 159 over to the outgoing cargo thru the pipe 155, which pipe is clearly shown in Figure 45, said pipe having a slot in its front portion to allow the cords to escape therefrom as the outgoing cargo and the outgoing or upper grippers are picked up, which prevents the cord from fouling with the propeller or other parts of the lower plane while the outgoing cargo is being handled.

In Figures 59 to 66 inclusive, I show my invention as applied to a dirigible balloon, and I have shown the cabin or gondola near the center of the balloon, but it is to be understood that this invention can be applied to a balloon having the cabin or gondola near the forward portion of the balloon or at any other part of the balloon.

This balloon is indicated by the reference character 190, and around the balloon I secure the light bands 191 and 192 on which I mount the pulleys 193 and in these pulleys the cable 194 is mounted, this being a continuous cable, there being two of these cables one for the band 191 and one for the band 192, and these cables pass downwardly through the cabin 195 and are wrapped around the windlass 196, and the arms 197 are secured around the cable 194 and project outwardly and support the carriage 198 which is similar to the carriage 22 shown in Figure 11, this carriage being pivotally mounted on the end of the arms 197, and on the upper edge of this carriage the out-going grippers 56, are adapted to be placed with the additional cargo 199 secured thereto and resting on shelves 55, and the shears and grippers are secured on the said carriage in the same manner as shown in Figure 11. Doors are provided on each side of the cabin and the shelves 200 and 201 are provided, the shelf 200 serving for in-coming cargo or the loading of out-going cargo or the loading of the grippers for the out-going cargo, and the shelf 201 serving to hold the out-going cargo. I also have mounted in the cabin the windlass 203 on which the cable 204 is mounted and this cable is supported by the pulleys 205 mounted on the band 206 passing around the balloon and on this cable 204 is mounted the hook 207 to which the cord 208 attached to the out-going mail may be secured and the windlass 203 is then turned to pass the hook 207 completely around the balloon to the other side of the cabin at which place it is loosed from the hook 207 and secured to the out-going grippers, and then when the windlass 196 is turned the carriage 198 will be raised to the position shown in Figure 60, and the guard rail 210 on the side of the balloon will serve to deflect the trailing cord 115 from a flying craft into the grippers and shears and lower grippers and cause the in-coming cargo to be secured to the lower grippers, the shears will cut the cord 115 and the out-going grippers will be picked up, with no cargo attached thereto, and will carry the loose cord 208 clear over the balloon and pick up the out-going cargo from the shelf 201, and take it off from the other side of the balloon, it being understood that the upper craft will be flying into the side of the lower craft but progressing in the same direction, but bearing to the left of the direction taken by the lower cargo.

In Figure 51 I show the diagrammatic view and the dotted line H indicates the path taken by the flying machine when the cargo is to be picked up from and attached to a carriage. The trailing cord will cross the path of the cord G and break the same and this will release the driving mechanism for the carriage to cause it to proceed downwardly on the cable, and then the plane swerves and the trailing cord will be pulled against the cable and guided into the jaws of the grippers and shears, and the out-going cargo will be picked up and the in-coming cargo will be secured to the lower grippers.

The supports 197 are secured to the cables by means of the strap 197a.

In the other figures, where one craft passes over another craft, at most times at the angle shown in Figure 5, the trailing cord 115 will be directed into the jaws of the grippers and into the jaws of the shears and the outgoing or upper grippers will be picked up and carried away with the outgoing cargo and then wound up into the plane by the pilot or operator carried by the craft, and the incoming cargo will be held by the lower grippers and the shears will sever the cord 115, and in this way an automatic and simultaneous transfer of cargo in both directions between two flying craft will be effected.

In the drawings and specification I have set forth preferred embodiments of my invention and although specific terms are employed they are used in a generic and descriptive sense only, and not for purposes of limitation, the scope of the invention being set forth in the appended claims:

I claim:

1. Means for simultaneously picking up cargo from a moving object and attaching cargo to a moving object, comprising devices for gripping a cord and being carried away by said cord and other devices for gripping a portion of said cord and retaining the same, and additional means for severing the cord between the retained portion and the carried away portion.

2. In a device for transferring cargo simultaneously between two moving aircraft, said means comprising a pair of grippers, a second pair of grippers, a pair of shears connected between the first and second grippers, and connections between the second grippers and the shears, said grippers and shears being adapted to receive a trailing cord to trip the upper grippers and carry the upper grippers and cargo attached thereto away from one of the aircraft, to trip the lower grippers to hold other cargo, and the shears being adapted to sever the cargo carrying means, to allow the in-coming cargo to be attached to the lower aircraft and the out-going cargo to be carried away by the upper aircraft.

3. Means for simultaneously transferring cargo from one aircraft to another with said aircraft flying one above the other comprising grippers mounted on the lower aircraft, shears mounted below the grippers, a second pair of grippers mounted below the shears, a connection between the upper and lower grippers, a connection between lower grippers and the shears, said upper grippers being adapted to grip a trailing cord from the upper aircraft and to be carried away thereby, cargo adapted to be attached to the upper grippers, the said connection between the grippers being adapted to trip the lower grippers to hold the lower portion of the cord, the connection between the lower grippers and the shears being adapted to trip the shears to sever the cord whereby in-coming cargo is attached to the lower aircraft, and out-going cargo is carried away from the lower aircraft by the upper aircraft.

4. Means for double transfer of cargo between two aircrafts, one aircraft being adapted to fly above the other aircraft, a trailing cord being adapted to be suspended from the upper aircraft, means for raising and lowering the cord, cargo adapted to be attached to the lower end of the cord, two pairs of grippers attached to the lower aircraft cargo attached to the upper grippers, the lower grippers being adapted to receive the incoming cargo, shears between the grippers adapted to be operated when the lower grippers are active to sever the cord to allow the upper grippers to be carried away by the upper aircraft and to cause the lower grippers to attach the in-coming cargo to the lower aircraft.

5. Means for handling cargo in aerial navigation which comprises a pair of detachable grippers secured to an aircraft, a pair of stationary grippers secured to the aircraft, a pair of shears between the two sets of grippers, a trailing cord adapted to be suspended from another aircraft and to be directed into the said grippers and shears, cargo adapted to be secured to the end of the trailing cord, the shears being adapted to sever the cord after both of the grippers have gripped the same, the lower grippers being adapted to hold the cargo attached to the end of the cord, and the upper grippers being adapted to be carried away by the said cord and the other aircraft, cargo adapted to be attached to the upper grippers, and means in the upper aircraft for winding up the cargo after it has been attached to the trailing cord.

6. Means for simultaneous transfer of cargo in both directions from two objects moving one above the other in approximately the same direction, said means comprising two sets of grippers, and a pair of shears therebetween, the upper grippers being adapted to have cargo secured thereto and being adapted to be attached to a trailing cord from the upper moving object and to be carried away thereby, cargo adapted to be attached to the lower end of the cord secured to the upper moving object, said cargo being adapted to be attached to the lower pair of grippers, and the shears being adapted to be operated by the grippers to sever the cord to allow the upper grippers to be carried away by the upper moving object, and to allow the lower grippers to secure the cargo attached to the cord to the lower moving object.

7. Means for simultaneous transfer of cargo in both directions from upper and lower flying crafts comprising two sets of grippers and a pair of shears disposed on the lower flying craft, a trailing cord adapted to be suspended from the upper flying craft, said trailing cord being adapted to engage said two sets of grippers on the lower flying craft, said grippers being adapted to be operated in sequence and the last set of grippers being adapted to operate the said shears to sever the cord to cause cargo on the end of the cord to be attached to the lower grippers and to cause the upper grippers to be carried away by the cord secured to the upper flying craft together with cargo attached to the upper grippers.

8. Means for transferring cargo from an upper aircraft to a lower aircraft in aerial navigation and simultaneously transferring cargo from the lower aircraft to the upper aircraft, said means comprising two sets of grippers on the lower aircraft, a trailing cord adapted to be suspended from the upper aircraft and to be engaged by the grippers on the lower aircraft, and a pair of cutting devices adapted to sever the cord between the two grippers to allow cargo attached to the lower end of the cord to be retained by the lower grippers on the lower plane and to cause the upper grippers on the lower aircraft to be carried away by the upper aircraft.

9. Means for simultaneously transferring cargo from one moving object to another moving object in both directions one moving object being adapted to move above the other moving object in approximately the same direction, said means comprising a trailing member from the upper object with cargo attached to the end of the trailing member, means on the lower object to grip the trailing member in two places, and means for severing the trailing member between the two places, the upper gripping means being adapted to be carried away by the cord, and the lower gripping means being adapted to retain the cord with the cargo attached thereto.

10. Means for transfer of cargo from one aircraft to another and at the same time transferring cargo from the other aircraft to the first-named craft, said means comprising grippers for receiving cargo from the upper aircraft and grippers for attaching cargo from the lower aircraft to the upper plane, and severing means adapted to separate the two different cargoes at the same time that they are attached to and detached from the two aircraft.

11. In a cargo transfer device, two flying crafts adapted to fly one above the other, a trailing cord from the upper craft, two gripping means on the lower craft, cutting means between the gripping means, cargo adapted to be attached to the end of the trailing cord, and cargo adapted to be attached to the upper gripping means, the upper gripping means being adapted to operate the lower gripping means, and the lower gripping means being adapted to operate the cutting means to separate the two cargoes.

FRANK F. BRADSHAW.